A. C. RECKER.
FASTENING MEANS FOR THE SUSPENSION CHAINS OF ELECTRIC FIXTURES.
APPLICATION FILED FEB. 28, 1921.

1,396,463.

Patented Nov. 8, 1921.

Inventor
Adolph C. Recker
by Seymour & Earle
attys

UNITED STATES PATENT OFFICE.

ADOLPH C. RECKER, OF OAKVILLE, CONNECTICUT, ASSIGNOR TO THE CHASE COMPANIES INC., OF WATERBURY, CONNECTICUT, A CORPORATION.

FASTENING MEANS FOR THE SUSPENSION-CHAINS OF ELECTRIC FIXTURES.

1,396,463.

Specification of Letters Patent. Patented Nov. 8, 1921.

Application filed February 28, 1921. Serial No. 448,691.

*To all whom it may concern:*

Be it known that I, ADOLPH C. RECKER, a citizen of the United States, residing at Oakville, in the county of Litchfield and State of Connecticut, have invented a new and useful Improvement in Fastening Means for the Suspension-Chains of Electric Fixtures; and I do hereby declare the following, when taken in connection with the accompanying drawings and the characters of reference marked thereon, to be a full, clear, and exact description of the same, and which said drawings constitute part of this application, and represent, in—

Figure 1:
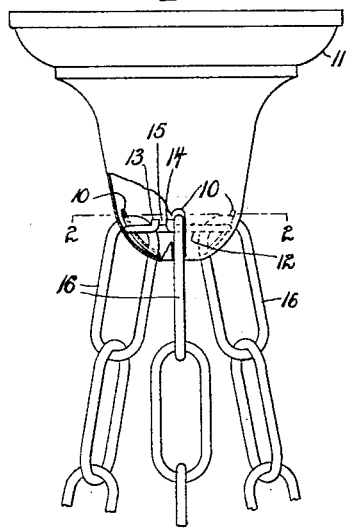

Figure 1, a broken view in side elevation of a canopy provided with my improved fastening means for the suspension-chains of electric-fixtures.

Figure 2:
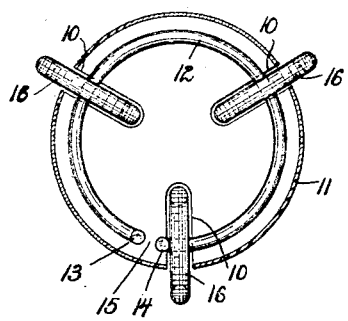

Fig. 2, an enlarged view thereof in horizontal section on the line 2—2 of Fig. 1.

Figure 3:
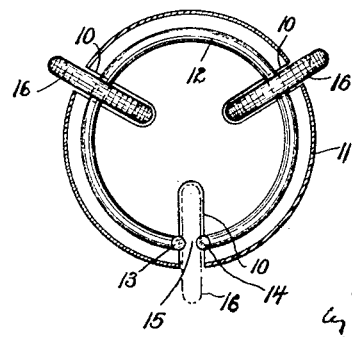

Fig. 3, a similar view showing the gap of the suspension-ring alined with one of the chain-slots in the canopy, preparatory to the engagement of the uppermost link of one of the chains with the ring, with which the uppermost links of the other two links are shown as engaged.

Figure 4:
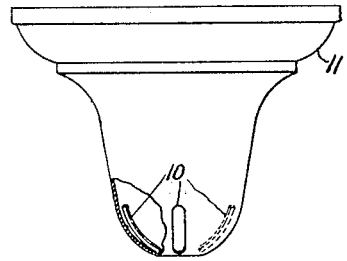

Fig. 4, a detached broken view in side elevation of the canopy.

Figure 5:
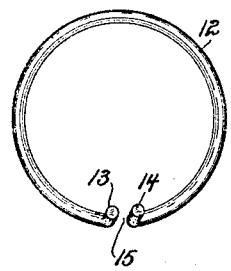

Fig. 5, a detached perspective view of the suspension-ring.

My invention relates to improved means for fastening the suspension-chains of electric-fixtures to the canopies thereof, the object being to provide simple, compact, convenient and secure fastening means of the character described, constructed with particular reference to ease of applying and removing the suspension-chains to and from the canopy.

With these ends in view, my invention consists in fastening means for the suspension-chains of electric-fixtures, the said fastening means having certain details of construction and combination of parts as will be hereinafter described and pointed out in the claim.

In carrying out my invention as herein shown, I form three tapering, or cone-like, lower end of the canopy 11, which may be of any approved form and construction, the said slots being spaced equally apart, as clearly shown in Figs. 2 and 3. Of course, if more than three chains are to be employed, the number of slots will be correspondingly increased. Within the cone-like lower end of the canopy I locate a suspension-ring 12, adapted in diameter to engage with the inner face of the canopy at a point about midway of the length of the slots 10, so as to be supported at such point in the horizontal plane, as shown in Fig. 1, in which the ring is seen to be located in a plane located between the upper and lower ends of the slots. The said ring, which is formed from a single piece of wire, has its ends turned upward at a right angle to form detents 13 and 14, which are spaced apart by an assembling gap 15 just wide enough to form a passageway into and out of the interior of the ring for the upper ends of the uppermost links of the suspension-chains 16, these links being formed of wire preferably a trifle smaller in diameter than the normal width of the gap, though this is not essential, as the gap may be temporarily enlarged by springing the ring by pressure of the links against the detents.

To fasten the chains to the canopy, the ring is manipulated by bodily turning it in its plane so as to register its gap 15 with one of the slots 10 in the canopy, as shown in Fig. 3. The upper link of the chain to be coupled with the ring is now inserted into the said slot and passed through the said gap, as also shown in the said figure. The interior of the upper end of the link will thus be registered with the upstanding detents 13 and 14 of the ring, which is now free to be rotated in one direction or the other. As shown in Fig. 2, the ring is bodily rotated from right to left to pass the detent 14 through the link which is now allowed to engage with the body of the ring. The other chains are applied in the same manner, the gap in the ring being registered successively with the other slots in the canopy. Now, although the ring may turn within the canopy within the limits set by the spacing apart of the slots, it is apparent that the chains cannot be released from it except by lifting them over either one or the other of its detents at a time when its gap is registered with one of the slots. It is apparent that if the ring works around in use, it will be stopped by the engagement of its detents with the tops of the links through which the ring passes.

I claim:

Fastening means for the suspension-chains of electric-fixtures, consisting of a canopy formed at its cone-like lower end with a plurality of vertical slots, and a suspension-ring adapted to be supported within the canopy in the horizontal plane at a point between the upper and lower ends of the said slots, and having its ends separated to form an assembling gap and upturned to form detents.

In testimony whereof, I have signed this specification in the presence of two subscribing witnesses.

ADOLPH C. RECKER.

Witnesses:
 JOHN S. NEAGLE,
 JOHN W. HAND.